United States Patent
Kumar

(10) Patent No.: US 12,014,162 B2
(45) Date of Patent: Jun. 18, 2024

(54) CONTROLLED UPDATES OF CONTAINERS IN A DISTRIBUTED APPLICATION DEPLOYMENT ENVIRONMENT

(71) Applicant: salesforce.com, inc., San Francisco, CA (US)

(72) Inventor: Mayank Kumar, Freemont, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/462,888

(22) Filed: Aug. 31, 2021

(65) Prior Publication Data

US 2023/0065431 A1    Mar. 2, 2023

(51) Int. Cl.
*G06F 8/65* (2018.01)
*G06F 9/445* (2018.01)

(52) U.S. Cl.
CPC .............. *G06F 8/65* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | * 10/1999 | Cram | G06F 30/00 707/999.102 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |

(Continued)

FOREIGN PATENT DOCUMENTS

CN    112596762 A  *  4/2021
WO    WO-2021150366 A1  *  7/2021  .......... G06F 11/0757

*Primary Examiner* — Philip Wang
*Assistant Examiner* — Rongfa P Wang

(57) ABSTRACT

System and methods are described for implementing controlled updates of containers in a distributed application deployment environment. In one implementation, a method comprises: receiving a request to update a target container of a plurality of containers within a deployed computing unit; identifying an updated configuration object to be applied to the target container based on the request; receiving or computing a health indicator representative of performance of the deployed computing unit or other containers to which the updated configuration object has been applied; and assigning the updated configuration object to the target container based on the health indicator.

17 Claims, 7 Drawing Sheets

(56) References Cited

U.S. PATENT DOCUMENTS

| | | | |
|---|---|---|---|
| 6,336,137 B1 | 1/2002 | Lee et al. | |
| D454,139 S | 3/2002 | Feldcamp et al. | |
| 6,367,077 B1* | 4/2002 | Brodersen | G06F 16/23 |
| | | | 717/169 |
| 6,393,605 B1* | 5/2002 | Loomans | G06F 9/44526 |
| | | | 717/121 |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson | |
| 10,007,509 B1* | 6/2018 | Qureshi | G06F 8/656 |
| 10,623,390 B1* | 4/2020 | Rosenhouse | H04L 67/10 |
| 11,025,495 B1* | 6/2021 | Bhatnagar | G06F 9/5011 |
| 11,062,022 B1* | 7/2021 | Kalamkar | G06F 9/45558 |
| 11,194,566 B1* | 12/2021 | Gabrielson | G06F 8/65 |
| 11,438,213 B1* | 9/2022 | Milley | H04L 41/064 |
| 11,467,875 B2* | 10/2022 | Kwon | G06F 9/5016 |
| 11,469,944 B1* | 10/2022 | Lindholm | H04L 41/0813 |
| 11,768,672 B1* | 9/2023 | Silakov | G06F 11/302 |
| | | | 717/172 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2014/0105030 A1* | 4/2014 | Kogan | H04L 43/0847 |
| | | | 370/242 |
| 2016/0065420 A1* | 3/2016 | Burton | H04L 41/5067 |
| | | | 709/224 |
| 2016/0155076 A1* | 6/2016 | Fix | G06Q 10/06395 |
| | | | 705/7.39 |
| 2017/0118041 A1* | 4/2017 | Bhattacharya | H04L 41/0895 |
| 2020/0073655 A1* | 3/2020 | Park | G06F 8/65 |
| 2020/0366569 A1* | 11/2020 | White | H04L 41/0816 |
| 2021/0173713 A1* | 6/2021 | Lei | G06F 9/5027 |
| 2021/0224132 A1* | 7/2021 | Barsalou | H04L 41/5054 |
| 2021/0311764 A1* | 10/2021 | Rosoff | G06F 9/5077 |
| 2021/0311796 A1* | 10/2021 | Lei | G06F 11/3442 |
| 2021/0328913 A1* | 10/2021 | Nainar | H04L 12/4641 |
| 2021/0349801 A1* | 11/2021 | Rafey | G06F 11/3495 |
| 2022/0035646 A1* | 2/2022 | Ibryam | G06F 9/45558 |
| 2022/0060398 A1* | 2/2022 | Shishir | G06F 11/3409 |
| 2022/0111516 A1* | 4/2022 | Yeap | G06F 8/65 |
| 2022/0124150 A1* | 4/2022 | Alagna | G06F 9/45558 |
| 2022/0247725 A1* | 8/2022 | Panchamia | H04L 63/164 |
| 2022/0326867 A1* | 10/2022 | Thakkar | G06F 3/067 |
| 2022/0326929 A1* | 10/2022 | Sharma | G06F 21/577 |
| 2022/0329524 A1* | 10/2022 | Sinha | H04L 41/16 |
| 2022/0334825 A1* | 10/2022 | Swirydczuk | G06F 8/65 |
| 2022/0407773 A1* | 12/2022 | Kempanna | H04L 43/06 |
| 2022/0407820 A1* | 12/2022 | Kempanna | H04L 43/0894 |

* cited by examiner

CONTROLLED UPDATES OF CONTAINERS IN A DISTRIBUTED APPLICATION DEPLOYMENT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to distributed storage and data processing systems, and, more specifically, to controlling container updates in a distributed application deployment environment.

BACKGROUND

Distributed computing systems utilize multiple components located on different machines to coordinate actions in a manner that appears as a single coherent system to end-users. In the Kubernetes platform, service owners are able request the injection of sidecar containers into their applications, which can handle various operations including provisioning of security certificates, decryption, or other tasks performed on behalf of the main application container. Sidecar injection is generally performed using the Kubernetes mutating admission webhook. The entity (e.g., personnel) responsible for producing, maintaining, and updating sidecar containers often different from the entity responsible for the main application container. In situations where the entity operating the sidecar container releases a new version of a sidecar container, this needs to be done in coordination with the entity responsible for operating the Kubernetes cluster. Simply updating or upgrading all sidecar containers at once, for example, across all tenants when the Kubernetes cluster is a multi-tenant environment, can lead to broken implementations if the updated version of the sidecar is not fully functional or has errors.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1A:
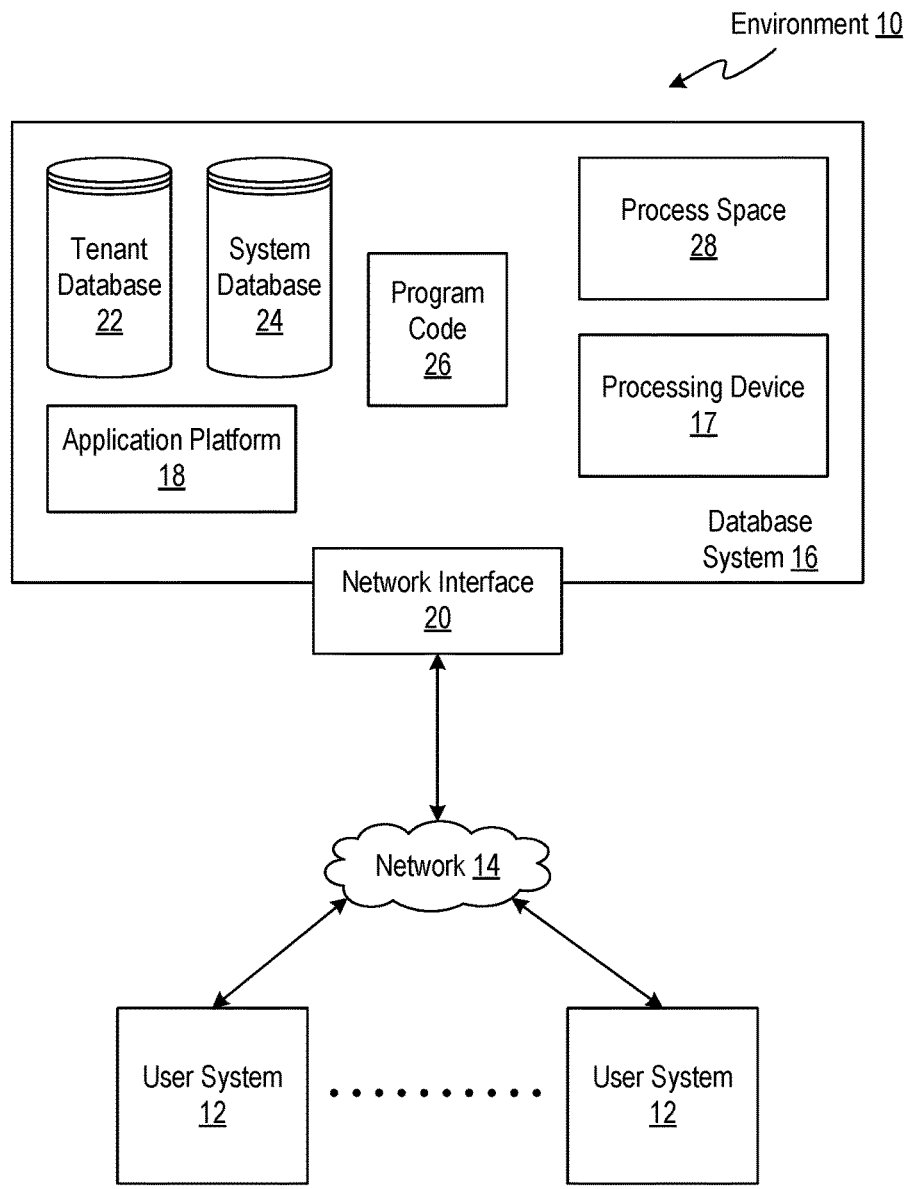
FIG. 1A shows a block diagram of an example environment in which an on-demand database service can be used according to some implementations.

The implementations described herein relate to systems and methods for implementing controlled updates of sidecar containers in a distributed application deployment environment, such as the Kubernetes platform. In general, the Kubernetes platform utilizes a configuration object called "MutatingWebhookConfiguration" (also referred to as a Kubernetes API for configuring Kubernetes mutating admission controllers) that is used to determine which version of a container (e.g., a sidecar container) is to be injected into an application of a service owner. The systems and methods described herein relate to a process for coordinating multiple configuration objects for a given set of sidecar containers within a "pod" (e.g., Kubernetes "pod," which is referred to herein more generally as a deployed computing unit) and updating them in a controlled manner such that the sidecar containers are gradually injected into their respective pods across all service owner applications. This approach avoids updates to be automatically applied to all sidecar containers, resulting in the failure of multiple pods, which can be detrimental if the update is not fully tested and/or has broken functionality. In addition, the updates can be applied in a health-mediated manner by applying updates to sidecar containers within pods at times at which the performance of the pods is favorable for applying updates and in an incremental manner. In some implementations, the updates are targeted to individual or groups of sidecar containers and/or specific pods or to pods belonging to a specific tenant or group of tenants before proceeding to other tenants. This avoids breaking all tenants at once or allows canarying the new change.

In web development, a "webhook," also referred to as a web callback or push application program interface (API) is a method of altering the behavior of a web page or web application and providing other applications with real-time information. A webhook allows for real-time information delivery without requiring frequent polling for data, as is the case with APIs generally. Moreover, most APIs involve requests followed by responses, while a webhook sends data once it becomes available.

Generally, the MutatingWebhookConfiguration is used by webhooks to provide automatic modification of Kubernetes resources when the resources are being generated. Most commonly, they are used to add sidecar containers at the time that an entity (e.g., a service owner) is attempting to generate a Kubernetes Pod. For example, a pod can include a sidecar container, which, on behalf of the main application container of the pod, can perform various functions such as requesting security certificates, rotating expired certificates, and providing encryption/decryption services. Instead of the sidecar container being part of the service owner's pod configuration, it is produced and/or maintained by a separate entity that owns upgrades of that sidecar container and uses the MutatingWebhookConfiguration to inject the sidecar container with its current configuration.

One limitation of utilizing the MutatingWebhookConfiguration is that it is difficult to modify sidecar container configurations centrally without affecting all associated services. For example, if an entity that owns the sidecar container modifies the configuration of that sidecar container, it immediately affects all services currently running. If any of the pods hosting the currently running services are deleted, newly generated pods will immediately get the new configuration for the modified sidecar container. A pod may be deleted, for example, if the service owner decides to upgrade the pod/service, the node running the service or pods terminates, if the availability zone of the node goes down, or if the pod is evicted due to scheduling of another higher priority pod. If the configuration for the modified sidecar container has a bug, this will bring down all services, and could potentially have a catastrophic effect. As an example, in the event of a region failure of a cloud computing platform (such as Amazon Web Services), if a sidecar container owner updates the sidecar container configuration centrally using the MutatingWebhookConfiguration, all pods that get deleted due to region failure will be injected with a faulty sidecar container once reinstantiated.

Implementations of the present disclosure address this and other limitations of current systems by utilizing multiple configuration objects (e.g., MutatingWebhookConfiguration objects) for the same sidecar container or group of sidecar containers, and manipulating the assignment and application of configuration objects using a "rolling update controller" that gradually increases the scope of new configurations while decreasing the scope of old configurations for sidecar containers. For example, a given sidecar container or group of sidecar containers may be associated with two different versions of a MutatingWebhookConfiguration object, which only differ in the version of the sidecar container to be injected (e.g., sidecar container X is associated with configuration objects MX1 and MX2, sidecar container Y is associated with configuration objects MY1 and MY2, etc.). Such implementations advantageously allow for updates to be applied and rolled out to sidecar containers across multiple pods in a non-disruptive and health-mediated manner (e.g., based on "health indicators" that inform the controller of appropriate times for which updates should be assigned or applied to sidecar containers). In some implementations, the rolling update controller continues to increase the scope of the new configuration objects (e.g., of MX2 for sidecar container X) and decrease the scope of old configuration objects (e.g., of MX1 for sidecar container X) in response to health indicators of newly generated pods that suggest that it is safe to do so.

Advantages of the implementations of the disclosure over current systems include, but are not limited to: (1) new updates are assigned to pods belonging to tenants on a gradual basis rather than all at once, which avoids breaking the functionality of all tenants implementing the sidecar container if that sidecar container is faulty; (2) the ability of the rolling update controller to choose the granularity at which to apply new versions of sidecar containers, such as one tenant at a time or one application at a time within a tenant; (3) updates can be applied globally after testing the functionality of the update after application to a subset of sidecar containers across multiple pods; (4) updates can be applied to sidecar containers without requiring a "dummy update" be applied to main container within the pod or require authorization by the entity responsible for the main application container; and (5) health indicators can be used to determine when updates should be applied, and can be computed simply by checking the availability of services provided by pods.

As used herein, a "deployed computing unit" refers to a collection of containers for implementing software, such as a pod implemented in Kubernetes.

As used herein, a "health indicator" refers to a metric used to gauge performance of a pod, a collection of pods, a container, or a collection of containers. Such metrics may include, but are not limited to, the availability of services associated with a pod or pods, and the functionality of one or more containers after an update has been applied. In some implementations, health indicators may be used to determine when and how updates are applied.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "executing," "generating," "processing," "reprocessing," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," "mapping," "causing," "storing," "prioritizing," "queuing," "managing," "serializing," "deserializing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (which is a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the database system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the database system 16, is a service that is made available to users outside an enterprise (or enterprises) that owns, maintains, or provides access to the database system 16. An "enterprise" refers generally to a company or organization that owns one or more data centers that host various services and data sources. A "data center" refers generally to a physical location of various servers, machines, and network components utilized by an enterprise.

As described above, such users generally do not need to be concerned with building or maintaining the database system 16. Instead, resources provided by the database system 16 may be available for such users' use when the users need services provided by the database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of the database system 16 to execute, such as the hardware or software infrastructure of the database system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the database system 16 implements a web-based customer relationship management (CRM) system. For example, in some such implementations, the database system 16 includes application servers configured to implement and execute CRM software applications as well as provide related data, code, forms, renderable web pages, and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The database system 16 also implements applications other than, or in addition to, a CRM application. For example, the database system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the database system 16.

According to some implementations, each database system 16 is configured to provide web pages, forms, applications, data, and media content to user (client) systems 12 to support the access by user systems 12 as tenants of the database system 16. As such, the database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with the database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between the database system 16 and the network 14, but other techniques can be used in addition to or instead of these techniques. In some implementations, the network interface 20 between the database system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, personal digital assistant (PDA), or other wireless device, allowing a user (for example, a subscriber of on-demand services provided by the database system 16) of the user system 12 to access, process, and view information, pages, and applications available to it from the database system 16 over the network 14.

Each user system 12 also typically includes one or more user input devices, such as a keyboard, a mouse, a trackball, a touch pad, a touch screen, a pen or stylus, or the like, for interacting with a GUI provided by the browser on a display (for example, a monitor screen, liquid crystal display (LCD), light-emitting diode (LED) display, etc.) of the user system 12 in conjunction with pages, forms, applications, and other information provided by the database system 16 or other systems or servers. For example, the user interface device can be used to access data and applications hosted by database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the database system 16, that user system can have the capacities allotted to the salesperson. However, while an administrator is using that user system 12 to interact with the database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as an Intel Pentium® processor or the like. Similarly, the database system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The database system 16 includes non-transitory computer-readable storage media having instructions stored thereon that are executable by or used to program a server or other computing system (or collection of such servers or computing systems) to perform some of the implementation of processes described herein. For example, the program code 26 can include instructions for operating and configuring the database system 16 to intercommunicate and to process web pages, applications, and other data and media content as described herein. In some implementations, the program code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, DVDs, CDs, microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™ JavaScript, ActiveX, any other scripting language, such as VBScript, and many other programming languages as are well known.

Figure 1B:
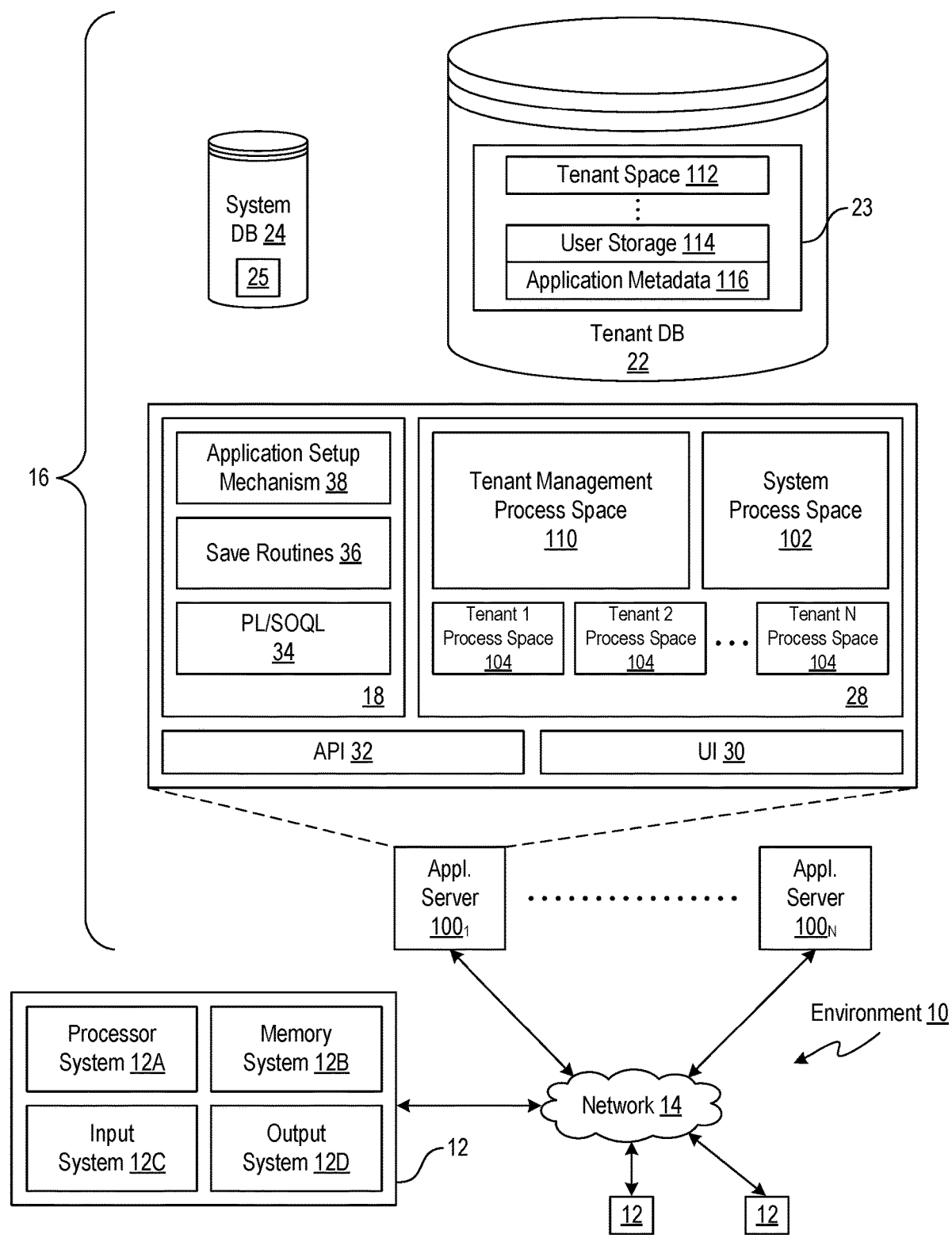
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the database system 16 and various interconnections between such elements are shown with more specificity according to some more specific implementations. In some implementations, the database system 16 may not have the same elements as those described herein or may have other elements instead of, or in addition to, those described herein.

In FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server," is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114, and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The database system 16 also includes a user interface (UI) 30 and an application programming interface (API) 32. The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using PL/SOQL 34, which provides a programming language style interface extension to the API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the database system 16. However, it will be apparent to one skilled in the art that other transport protocols can be used to optimize the database system 16 depending on the network interconnections used.

In some implementations, each application server 100 is configured to handle requests for any user associated with any organization that is a tenant of the database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the database system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the database system 16. Such requests and updates can involve sending one or more queries to tenant database 22 or system database 24. The database system 16 (for example, an application server 100 in the database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
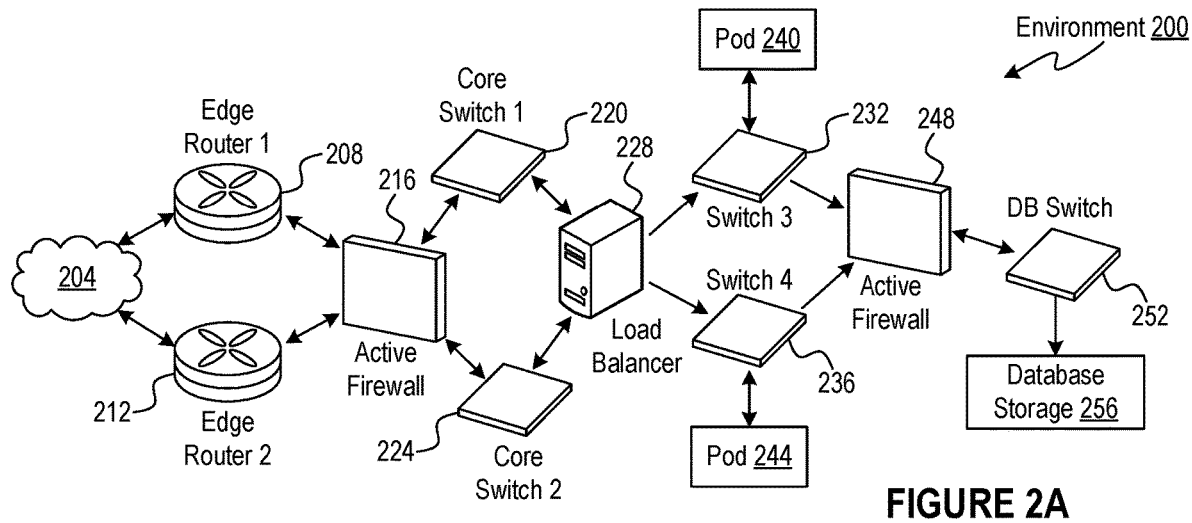
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
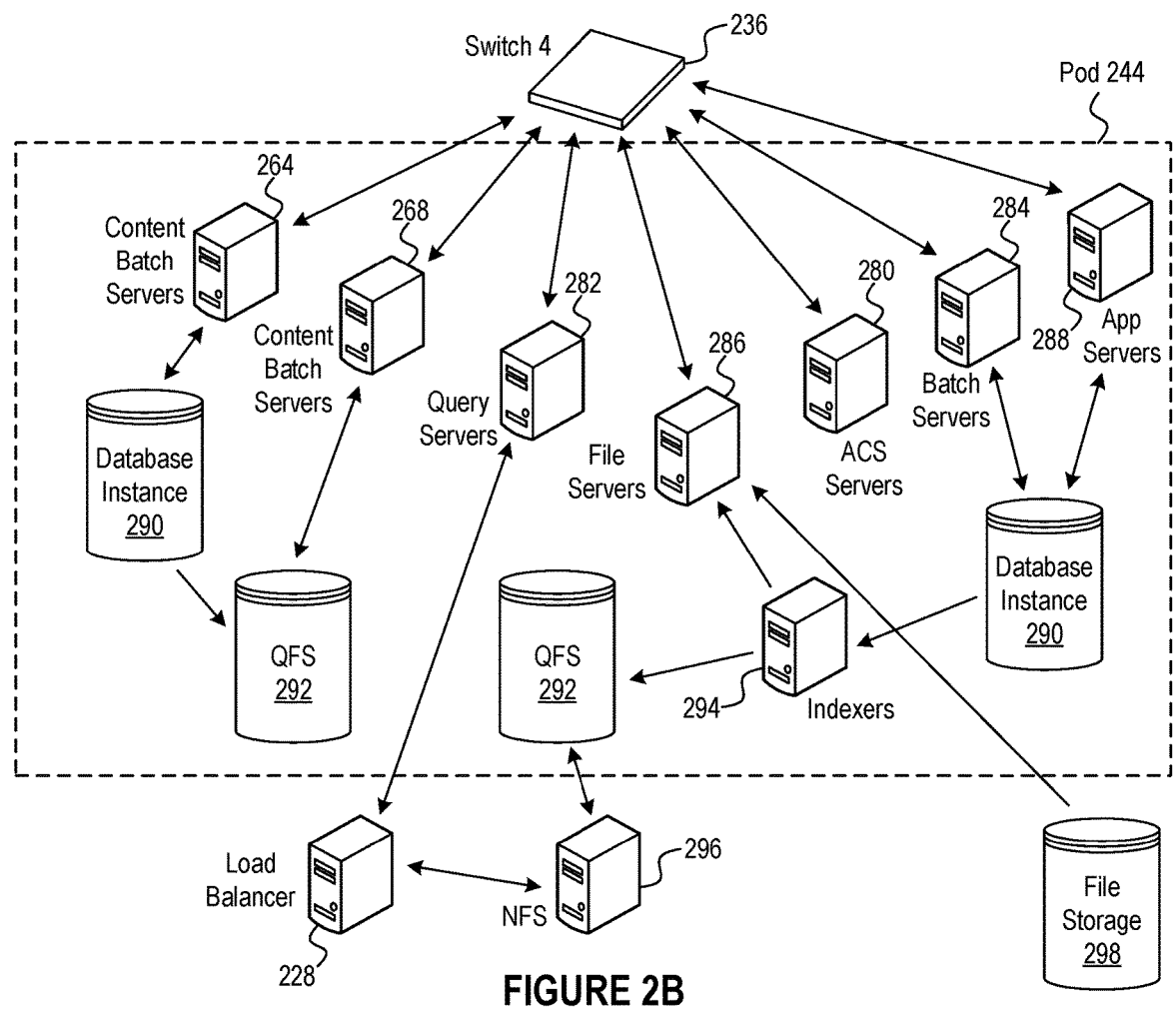
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of Internet Protocol (IP) networks or 'prefixes,' which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example, via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as SQL injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the pod switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and binary large objects (BLOBs). By managing requests for information using the file servers 286, the image footprint on the database can be reduced. The query servers 282 can be used to retrieve information from one or more file systems. For example, the query servers 282 can receive requests for information from the app servers 288 and transmit information queries to the network file systems (NFS) 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems, Inc. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the NFS 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database instance 290 or QFS 292. The index information can be provided to the file servers 286 or the QFS 292.

Figure 3:
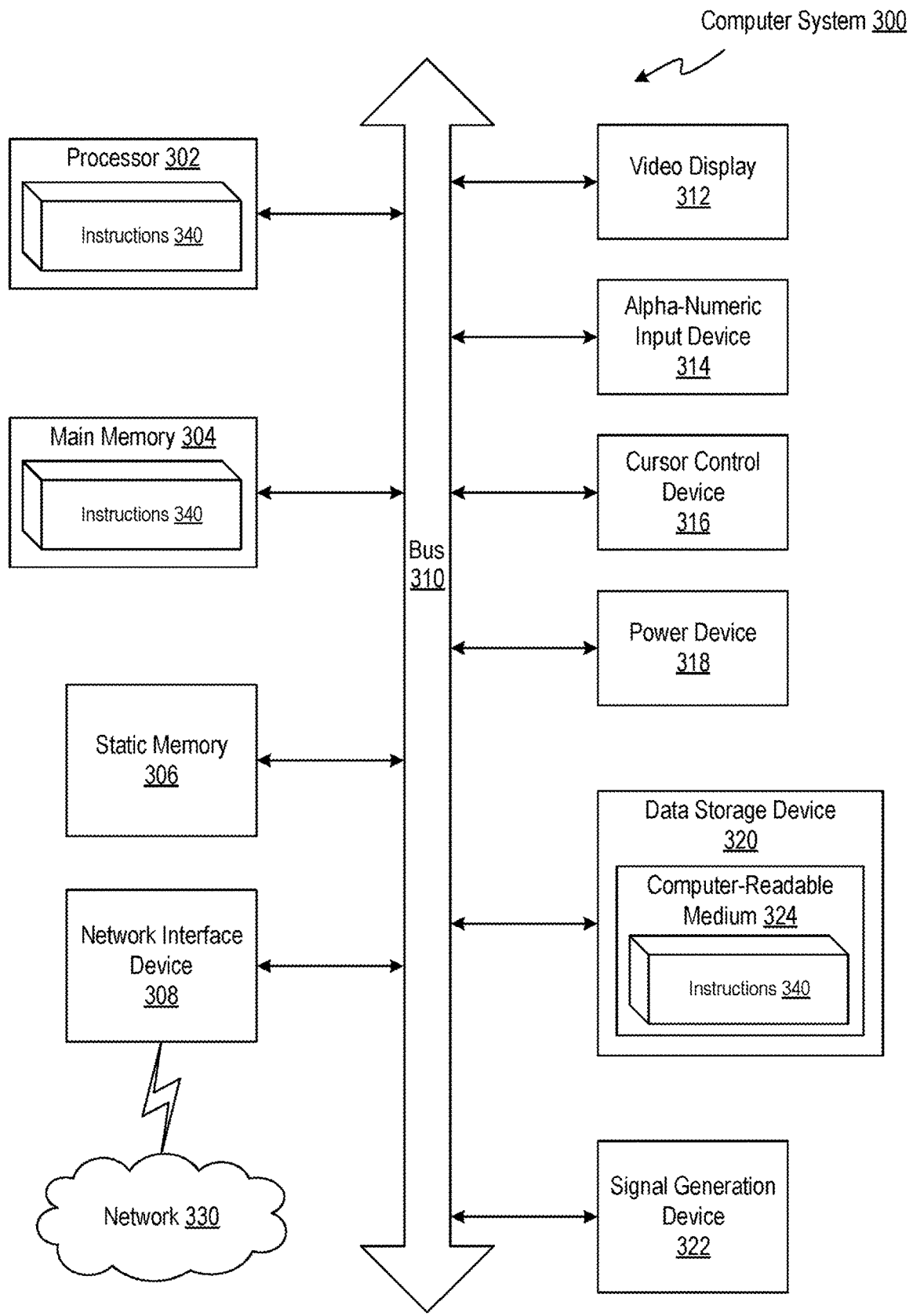
FIG. 3 illustrates a diagrammatic representation of a machine in the exemplary form of a computer system within which one or more implementations may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 340 for performing the operations and steps discussed herein.

The computer system 300 may further include a network interface device 308. The computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse), and a signal generation device 322 (e.g., a speaker).

Power device 318 may monitor a power level of a battery used to power the computer system 300 or one or more of its components. The power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to the power device 318 may be accessible remotely (e.g., accessible to a remote back-up management module via a network connection). In some implementations, a battery utilized by the power device 318 may be an uninterruptable power supply (UPS) local to or remote from computer system 300. In such implementations, the power device 318 may provide information about a power level of the UPS.

The data storage device 320 may include a computer-readable storage medium 324 (e.g., a non-transitory computer-readable storage medium) on which is stored one or more sets of instructions 340 (e.g., software) embodying any one or more of the methodologies or functions described herein. These instructions 340 may also reside, completely or at least partially, within the main memory 304 and/or within the processor 302 during execution thereof by the computer system 300, the main memory 304, and the processor 302 also constituting computer-readable storage media. These instructions 340 may further be transmitted or received over a network 330 (e.g., the network 14) via the network interface device 308. While the computer-readable storage medium 324 is shown in an exemplary implementation to be a single medium, it is to be understood that the computer-readable storage medium 324 may include a single medium or multiple media (e.g., a centralized or distributed database, and/or associated caches and servers) that store the one or more sets of instructions 340.

Controlled Updates of Sidecar Containers

Figure 4:
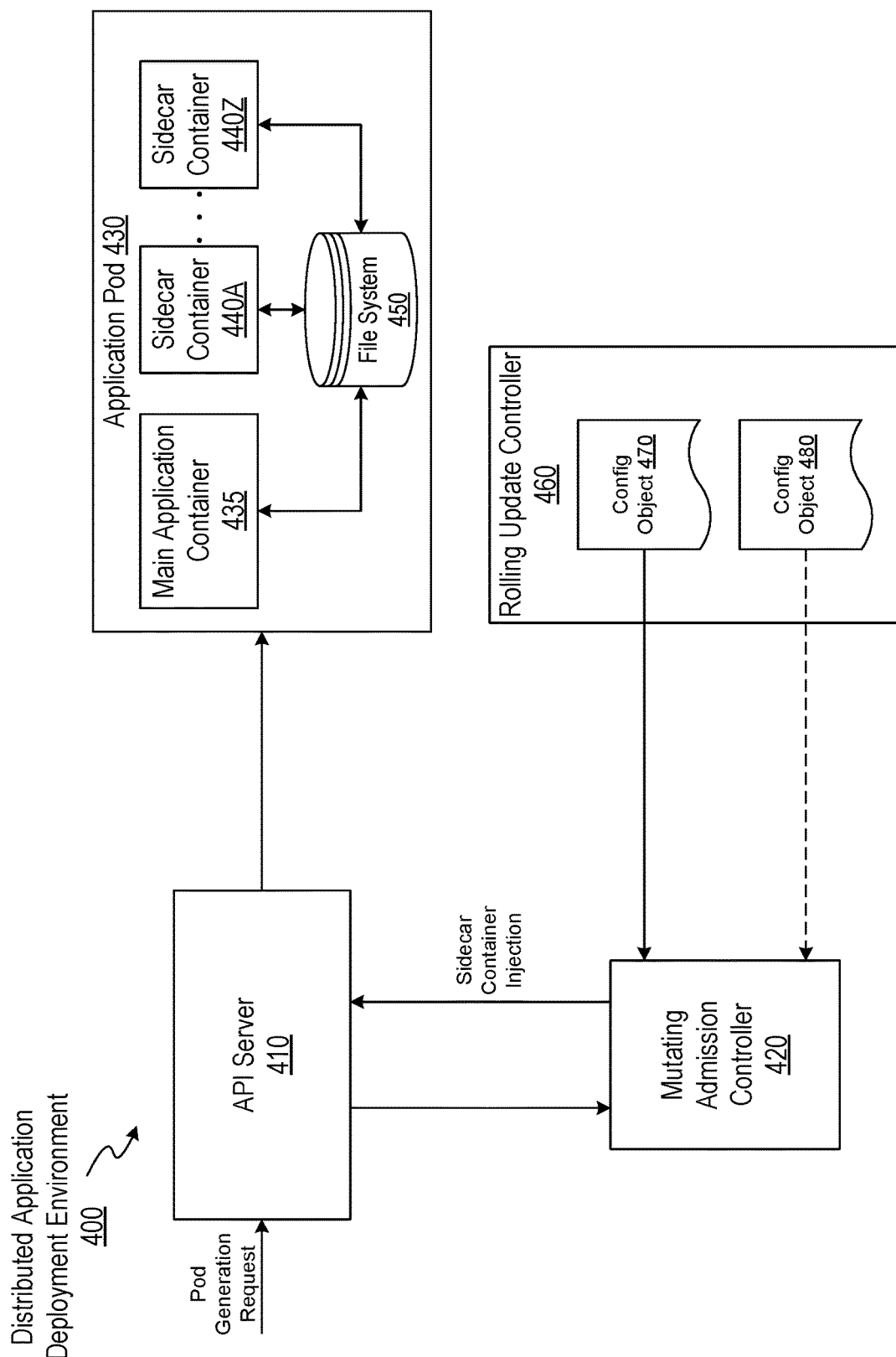
FIG. 4 illustrates an exemplary distributed application deployment environment for controlling updates to one or more sidecar containers according to some implementations is illustrated.

Referring now to FIG. 4, an exemplary distributed application deployment environment 400 for controlling updates to one or more sidecar containers 440A-440Z according to some implementations is illustrated. In some implementations, the distributed application deployment environment 400 is implemented on the Kubernetes platform. As illustrated, the distributed application deployment environment 400 includes an API server 410, an application pod 430 (which may also be referred to as a "deployed computing unit"), a mutating admission controller 420, and a rolling update controller 460.

Each Kubernetes cluster has an associated API server 410 through which an API is implemented for pods, services, and configuration objects. In some implementations, the API server 410 configures application pods, services, replication controllers, and other objects. In some implementations, the API server 410 provides a front end to a cluster's shared state through which other components interact. In some implementations, the API server 410 is configured to generate various pods, such as the application pod 430. In some implementations, the API server 410 comprises a scheduler component which may be used to determine and select a node for running a pod. Data associated with each pod run by the API server 410 may be stored in an associated database (e.g., a Kubernetes etcd cluster).

In some implementations, the application pod 430 includes a main application container 435 and one or more sidecar containers 440A-440Z. Each container of the application pod 430 may have an associated file system 450 for storing and retrieving data associated with the containers. While only a single application pod is shown as part of the distributed application deployment environment 400, this is merely illustrative and it is to be understood that multiple application pods may be present.

In some implementations, application pods, such as the application pod 430, are generated by the API server 410 in response to a pod generation request. The request may come from, for example, an entity responsible for producing and maintaining the main application container 435.

In some implementations, the mutating admission controller 420 intercepts requests sent to the API server 410 prior to generation of the application pod 430. For example, if the request to generate the application pod 430 comes from a first entity and a second entity requests that that the sidecar container 440A is included in the application pod 430 at instantiation, the mutating admission controller 420 "injects" the sidecar container 440A into the application pod 430. In some implementations, the mutating admission controller 420 utilizes the MutatingWebhookConfiguration, which controls which application pods are injected with which sidecar containers, as well as which version (configuration) of the sidecar containers will be used. In some implementations, for a given type of sidecar container, there will be an associated configuration object 470 that may be maintained by the rolling update controller 460. If the configuration object 470 is assigned to the sidecar container 440A, then at instantiation of the application pod 430, the configuration object 470 is provided to the mutating admission controller 420 when injecting the sidecar container 440A into the application pod 430. The sidecar container 440A, for example, can be of a particular type that is injected into other application pods that may be instantiated by the API server 410. The rolling update controller 460 maintains a configuration object 470 for the type of sidecar container 440A to ensure that the sidecar container 440A will have the configuration specified by the configuration object 470 at the time of injection into the application pod 430 or other application pods.

In some implementations, the rolling update controller 460 manages configuration objects of sidecar containers of the same type across multiple pods. As illustrated, the rolling update controller 460 manages a configuration object 470 and a configuration object 480. The configuration object 470 may be assigned to all sidecar containers of a particular type, and the second configuration object 480 is applied to none of the sidecar containers of the particular type. For example, all application pods may be running the sidecar container 440A with the configuration object 470, while the configuration object 480 is not applied to any application pods (the configuration objects 470 and 480 can both include the sidecar container 440A with different Docker image versions as well as with different configurations for the sidecar container 440A). In some implementations, when a new version of the sidecar 440A becomes available, the configuration object 480 is updated based on the new version. In some implementations, the rolling update controller 460 gradually assigns the configuration object 480 to sidecar containers of the same type as the sidecar container 440A, thus reducing the scope of the configuration object 470. In some implementations, the rolling update controller 460 informs a user of the new configuration object 480 for the sidecar container 440A, and allows the user to control the rate at which updates to the sidecar container 440A are applied across application pods.

In some implementations, the application of the configuration object 480 may be performed on a namespace basis (e.g., in some implementations, a namespace in Kubernetes can be mapped to a tenant). For example, multiple namespaces may be defined that each correspond to sidecar containers of the same type as the sidecar container 440A over a set of application pods. When the update is to be applied to sidecar containers of a particular namespace, only those sidecar containers associated with that namespace will have the configuration object 480 assigned or applied. In some implementations, updates within a particular namespace may be applied on a workload by workload basis, thus providing the new configuration object 480 gradually.

In implementations pertaining to the Kubernetes platform, a first MutatingWebhookConfiguration object may include a reference label to a particular namespace. When the rolling update controller 460 determines that sidecar containers of particular namespace are to be updated, the rolling update controller 460 then removes the reference label from the first MutatingWebhookConfiguration object and adds it to a second MutatingWebhookConfiguration corresponding to the new sidecar version so that sidecar containers associated with the namespace are now targeted for the update. In some implementations, a user may set a speed of the rollout, which may result in assignment of the configuration object 480 to sidecar containers and the corresponding application pod deletion (e.g., to trigger new sidecar injection associated with the configuration object 480), for example, on a daily basis, a weekly basis, or a monthly basis to various application pods.

Figure 5:
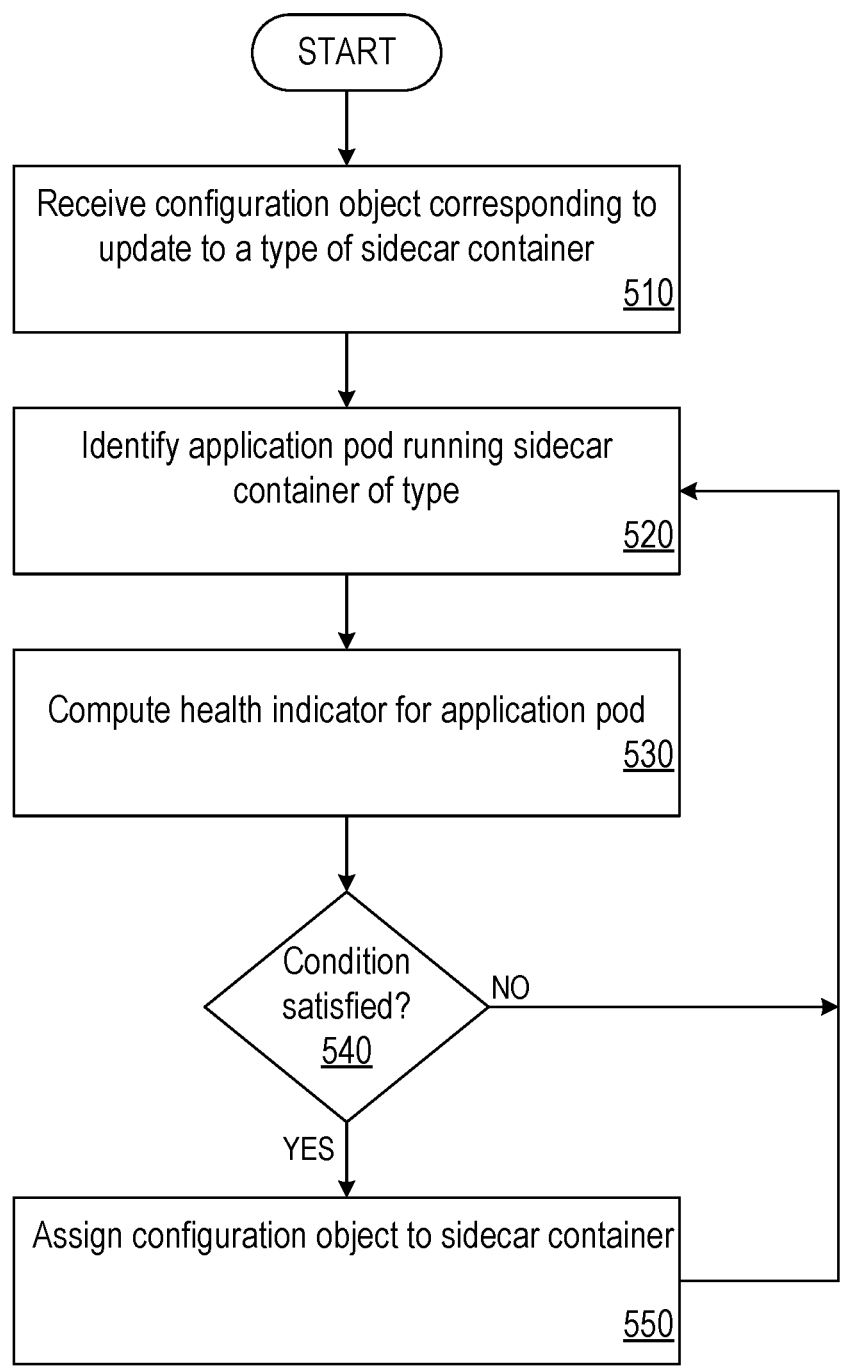
FIG. 5 is a flow diagram illustrating an exemplary method for applying updates to sidecar containers on a pod-by-pod basis according to some implementations.

In some implementations, the rate at which updates are applied to sidecar containers may be performed in a health-mediated manner. The logic by which the rolling update controller 460 makes update decisions is now described in detail below with respect to FIG. 5, which is a flow diagram illustrating an exemplary method 500 for applying updates to sidecar containers on a pod-by-pod basis according to some implementations. The method 500 may be performed by processing logic comprising hardware (e.g., circuitry, dedicated logic, programmable logic, microcode, etc.), software (such as instructions run on a processing device), or a combination thereof. In some implementations, the method 500 may be performed by a database system (e.g., the database system 16), and or a distributed data processing system implementing, for example, the distributed application deployment environment 400 via one or more processing devices. It is to be understood that these implementations are merely exemplary, and that other devices may perform some or all of the functionality described.

At block 510, the rolling update controller 460 receives the configuration object 480, which corresponds to an update of sidecar containers of the same type as the sidecar container 440A (e.g., which may pertain to security certificate provisioning or another type of task to supplement the functionality of the main application container 435).

At block 520, the rolling update controller 460 identifies an application pod (e.g., the application pod 430) implementing a sidecar container of the type associated with the configuration object 480. For example, the application pod may be identified based on a namespace basis, as described above. In some implementations, the application pod may be specifically identified by a user.

At block 530, the rolling update controller 460 computes a health indicator for the identified application pod. In some implementations, the health indicator may relate directly to a status of the identified application pod. For example, the health indicator may be computed based on an availability of services associated with the application pod, such as Uniform Resource Locator (URL) links. In some implementations, the health indicator may be computed based on the performance of newly generated pods. For example, in some implementations, if newly generated pods provide the same or similar services as the identified application pod such that applying the updated configuration object 480 to the identified application pod will not interrupt the services or will have an insubstantial effect on the services, this can result in a favorable health indicator. In some implementations, the health indicator is computed based on a status of sidecar containers to which the update has already been applied. For example, if the update was applied selectively to a subset of sidecar containers and the updated sidecar containers are functional or have been tested, a favorable health indicator may be generated.

At block 540, the rolling update controller 460 determines whether a condition is satisfied by the computed health indicator. For example, if the health indicator is a numerical score, the condition may be that the health indicator is greater than a threshold score. In some implementations, a user may specify the threshold score or may override the threshold condition. If at block 540 the rolling update controller 460 determines that the condition is satisfied, then the method 500 proceeds to block 550 where the configuration object 480 is assigned to the sidecar container of the identified application pod (e.g., the rolling update controller 460 modifies the sidecar containers targeted by the configuration objects 470 and 480). In some implementations, the rolling update controller 460 selectively deletes pods (e.g., pods to which the configuration object 480 has been assigned), such that when the API server 410 re-generates the deleted pods, the mutating admission controller 420 injects the correct or up-to-date version of the sidecar containers. The targeting of sidecar containers be performed at the namespace or object level (e.g., the configuration object 470 may target particular pods within a namespace by filtering with various keys and values to identify pods having those keys and values) and the targeting may be updated in a gradual manner. For example, for n namespaces, the rolling update controller can modify the configuration object 470, based on one or more health indicators, to target n−1 namespaces and the configuration object 480 to target 1 namespace, can further modify the configuration object 470 to target n−2 namespaces and the configuration object 480 to target 2 namespace, and so on until the configuration object 470 targets 0 namespaces and the configuration object 480 targets n namespaces. The method then proceeds once again to block 520 where a new application pod is identified. Otherwise, if the condition at block 540 is not satisfied, the method 500 proceeds directly to block 520. In some implementations, the rolling update controller 460 may revisit an application pod for which the health indicator condition was not satisfied, for example, after a predefined time period has elapsed. In some implementations, the method 500 repeats continuously until all sidecar containers across the various pods are updated.

An exemplary algorithm is now described for the Kubernetes platform, where: (1) several tenants are present that each map to one Kubernetes namespace; (2) each tenant (i.e., namespace) has multiple application pods; (3) each application pod includes multiple types of sidecar containers; and (4) each tenant can additionally mark one of its pods as a "canary," which refers to a pod that is designated as the first pod to be updated, with other pods being updated thereafter based on a health measures. The rolling update controller 460 selects a first tenant, and the sidecar owner updates the configuration object 480 with the new version of the sidecar container. The rolling update controller 460 then updates the configuration object 480 to point to the first tenant and removes the reference to the first tenant from the configuration object 470. The rolling update controller 460 slowly starts deleting pods in the tenant namespace (with the canary pod being deleted first in some implementations) to trigger injection of new sidecar containers corresponding to the configuration object 480 in view of the various health indicator rules. When all pods of the first tenant updated, the rolling update controller 460 selects a second tenant, and the process continues. In some implementations, for a given tenant, the rolling update controller 460 may avoid deleting pods until after a health indicator of the canary pod indicates that the canary pod is healthy.

Figure 6:
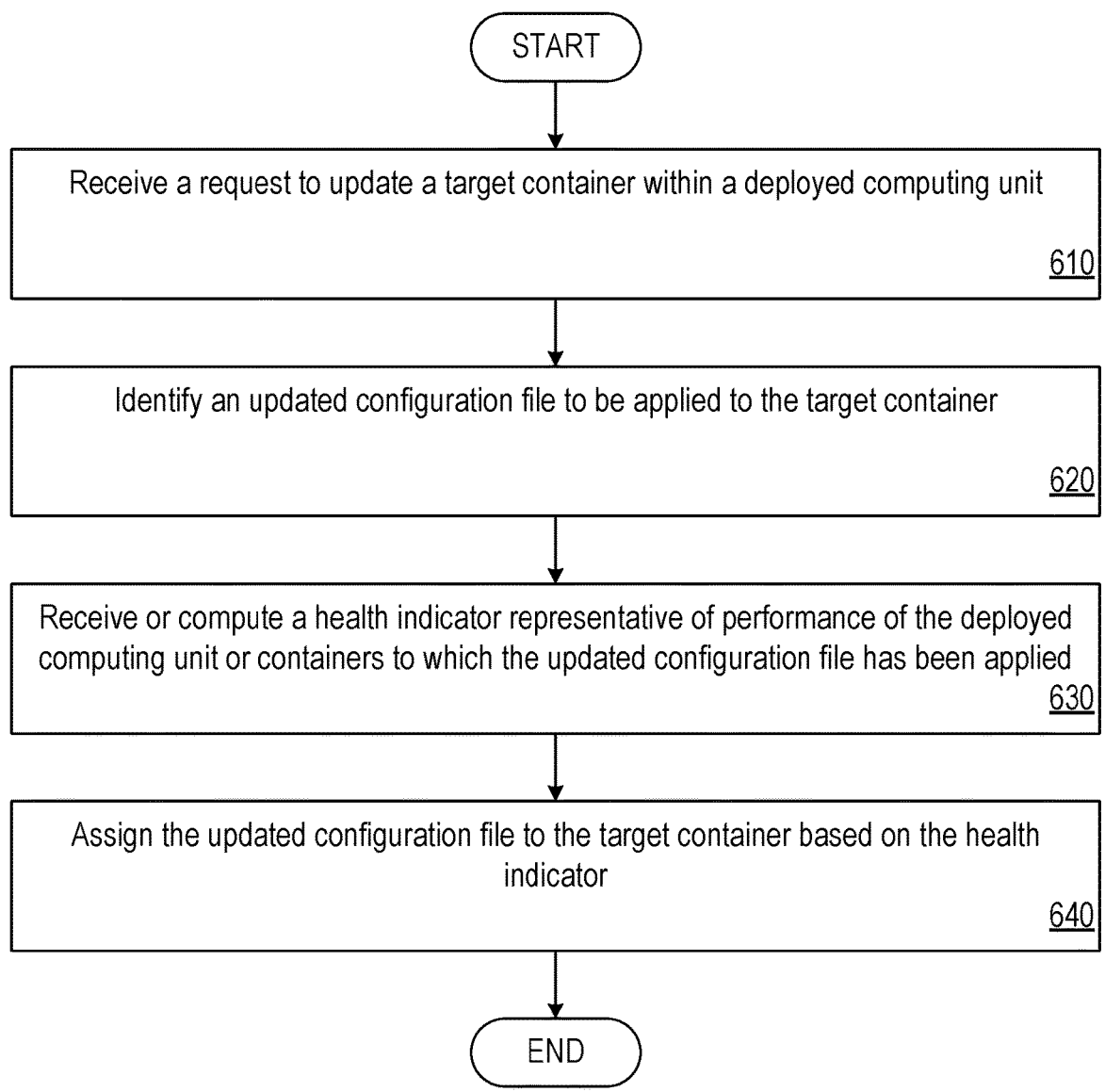
FIG. 6 is a flow diagram illustrating an exemplary method of updating containers in a distributed application deployment environment according to some implementations.

Reference is now made to FIG. 6, which is a flow diagram illustrating an exemplary method 600 for implementing controlled updates of containers in a distributed application deployment environment according to some implementations. The method 600 may be performed by processing logic comprising hardware (e.g., circuitry, dedicated logic, programmable logic, microcode, etc.), software (such as instructions run on a processing device), or a combination thereof. In some implementations, the method 600 may be performed by a database system (e.g., the database system 16), and or a distributed data processing system implementing, for example, the rolling update controller 460 via one or more processing devices. It is to be understood that these implementations are merely exemplary, and that other devices may perform some or all of the functionality described.

Referring to FIG. 6, at block 610, a rolling update controller (e.g., the rolling update controller 460) receives a request to update a target container of a plurality of containers (e.g., sidecar container 440A of sidecar containers 440A-440Z) within a deployed computing unit (e.g., the application pod 430). As used herein, "target," when referring to a container, indicates that the container is selected or identified for the purpose of being updated (i.e., a configuration object describing the configuration of the container is to be updated or replaced). The target container may be associated with a current configuration object (e.g., the configuration object 470) that is assigned to the target container. For example, if the deployed computing unit fails, is shut down, or is reset, reinjection of the target container into the deployed computing unit would result in a container having a configuration specified by the current configuration object.

In some implementations, the plurality of containers of the deployed computing unit include a main application container (e.g., the main application container 435). In some implementations, the request is received from an entity responsible for generating, maintaining, and/or updating the target container, which may be a different entity from the entity that requested deployment or instantiation of the deployed computing unit and/or is responsible for generating, maintaining, and/or updating a main application container.

In some implementations, prior to receiving the request to updating the target container, a request is received to initiate the deployed computing unit (which can result in deletion of an existing deployed computing unit and injection of a sidecar container in the re-generated deployed computing unit based on an older configuration file). A request to include the target container within the deployed computing unit is received before or concurrently with the request to initiate the deployed computing unit, for example, by a mutating admission controller (e.g., the mutating admission controller 420). The deployed computing unit is then generated to include the target container (e.g., via injection of the target container into the deployed computing unit via the mutating admission controller 420).

At block 620, an updated configuration object (e.g., the configuration object 480) to be applied to the target container is identified based on the request. For example, the request may contain the updated configuration object, may comprise information used to locate the updated configuration object, such as URL links, or may contain information for modifying the current configuration object to generate the updated configuration object. In some implementations, the updated configuration object is stored by or accessible to the rolling update controller and/or an associated server (e.g., the API server 410).

At block 630, a health indicator is received or computed, where the health indicator is representative of performance of the deployed computing unit or containers to which the updated configuration object has been applied. In some implementations, assigning the updated configuration object to the target container based on the health indicator comprises assigning the updated configuration object to the target container responsive to a determination that the health indicator satisfies a threshold condition.

In some implementations, the health indicator is representative of performance of the deployed computing unit, which may be used to determine whether the deployed computing unit is in condition for applying updates to its various containers. For example, the health indicator can be computed based on an availability of Uniform Resource Locator (URL) links associated with the deployed computing unit or services associated with the deployed computing unit. For example, if one or more URL links associated with the deployed computing unit are unresponsive, a health score may be computed for that particular point in time based on a percentage of unavailable URL links out of a total number of associated URL links. In some implementations, the health score is computed as a time series, which may be used to track URL availability over time. In some implementations, the rolling update controller may determine that the deployed computing unit is not in condition for applying updates to its various container based on the health score, and may wait until a future time where an average health score value over time is meets a threshold value before assigning or applying the updated configuration object.

In some implementations, the health indicator is representative of performance of other containers to which the updated configuration object has been applied, wherein one or more of the other containers are associated with a different deployed computing unit.

In some implementations, the updated configuration object is assigned to the target container without requiring that an update is applied to the main application container or without requiring authorization by the entity responsible for the main application container.

At block 640, the updated configuration object is assigned to the target container based on the health indicator. In some implementations, the updated configuration object is not applied to the target container until a triggering event, such as failure or termination of the deployed computing unit. Once the deployed computing unit is reinstantiated, the sidecar container injected into the deployed computing unit (e.g., via the mutating admission controller 420 in combination with the API server 410) will have the updated configuration object applied.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method, comprising:
   receiving, by a computer system, a request to update a target container of a plurality of containers within a computing unit deployed in a distributed application deployment environment, wherein the target container was deployed in accordance with a current configuration object defining a first version of the target container;
   identifying, by the computer system, an updated configuration object to be applied to the target container based on the request, wherein the updated configuration object defines a second version of the target container;
   determining, by the computer system, a health indicator representative of performance of other containers, of a same type as the target container, to which the updated configuration object has already been applied, wherein the other containers are included in respective computing units deployed in the distributed application deployment environment; and
   in response to the health indicator indicating that the other containers are functional, the computer system assigning the updated configuration object to the target container such that, for a subsequent deployment of the computing unit, the target container is deployed in accordance with the updated configuration object.

2. The method of claim 1, wherein the plurality of containers comprise a main application container maintained by a first entity, and wherein the target container is a sidecar container maintained by a second entity that is different from the first entity.

3. The method of claim 2, wherein the updated configuration object is assigned to the target container without requiring that an update is applied to the main application container or without requiring authorization by the first entity.

4. The method of claim 1, wherein the health indicator is representative of performance of the computing unit, and wherein the health indicator is computed based on an availability of Uniform Resource Locator (URL) links associated with the computing unit or services associated with the computing unit.

5. The method of claim 1, wherein the target container is associated with a first tenant and is upgraded prior to a second target container, of the same type as the target container, associated with a second tenant, and wherein the method further comprises the computer system assigning the updated configuration object to the second target container based on a health indicator of the target container.

6. The method of claim 1, further comprising:
   prior to receiving the request to updating the target container, receiving, by the computer system, a request to initiate the computing unit;

receiving, by the computer system, a request to include the target container within the computing unit upon generation; and generating, by the computer system, the computing unit.

7. A system for implementing a distributed application deployment environment, the system comprising:

one or more processing devices; and a memory device coupled to the one or more processing devices, the memory device having instructions stored thereon that, in response to execution by the one or more processing devices, cause the one or more processing devices to:

receive a request to update a target container of a plurality of containers within a computing unit deployed in the distributed application deployment environment, wherein the target container was deployed in accordance with a current configuration object defining a first version of the target container;

identify an updated configuration object to be applied to the target container based on the request, wherein the updated configuration object defines a second version of the target container;

receive or compute a health indicator representative of performance of the computing unit or other containers, of a same type as the target container, to which the updated configuration object has been applied, the health indicator being computed as a time series to track a ratio of unavailable services to a total number of services associated with the computing unit, wherein the other containers are included in respective computing units deployed in the distributed application deployment environment; and assign the updated configuration object to the target container based on the health indicator such that, for a subsequent deployment of the computing unit, the target container is deployed in accordance with the updated configuration object.

8. The system of claim 7, wherein the plurality of containers comprise a main application container maintained by a first entity, and wherein the target container is a sidecar container maintained by a second entity that is different from the first entity.

9. The system of claim 8, wherein the updated configuration object is assigned to the target container without requiring that an update is applied to the main application container or without requiring authorization by the first entity.

10. The system of claim 7, wherein the health indicator is representative of performance of the computing unit, and wherein the health indicator is to be computed based on an availability of Uniform Resource Locator (URL) links associated with the computing unit or services associated with the computing unit.

11. The system of claim 7, wherein the updated configuration object is assigned to the target container responsive to a determination that the health indicator satisfies a threshold condition.

12. The system of claim 7, wherein the one or more processing devices are to further:

receive a request to initiate the computing unit prior to receiving the request to updating the target container;

receive a request to include the target container within the computing unit upon generation; and generate the computing unit.

13. A non-transitory computer-readable storage medium having instructions encoded thereon which, when executed by one or more processing devices of a distributed data processing system, cause the one or more processing devices to perform operations comprising:

receiving a request to update a target container of a plurality of containers within a computing unit deployed in a distributed application deployment environment, wherein the target container was deployed in accordance with a current configuration object defining a first version of the target container;

identifying an updated configuration object to be applied to the target container based on the request, wherein the updated configuration object defines a second version of the target container;

determining a health indicator representative of performance of other containers, of a same type as the target container, to which the updated configuration object has already been applied, wherein the other containers are included in respective computing units deployed in the distributed application deployment environment; and in response to the health indicator indicating that the other containers are functional, assigning the updated configuration object to the target container such that, for a subsequent deployment of the computing unit, the target container is deployed in accordance with the updated configuration object.

14. The non-transitory computer-readable storage medium of claim 13, wherein the plurality of containers comprise a main application container maintained by a first entity, wherein the target container is a sidecar container maintained by a second entity that is different from the first entity, and wherein the updated configuration object is assigned to the target container without requiring that an update is applied to the main application container or without requiring authorization by the first entity.

15. The non-transitory computer-readable storage medium of claim 13, wherein the health indicator is representative of performance of the computing unit, and wherein the health indicator is to be computed based on an availability of Uniform Resource Locator (URL) links associated with the computing unit or services associated with the computing unit.

16. The non-transitory computer-readable storage medium of claim 13, wherein the target container is associated with a first tenant and is upgraded prior to a second target container, of the same type as the target container, associated with a second tenant, and wherein the operations further comprise assigning the updated configuration object to the second target container based on the health indicator of the target container.

17. The non-transitory computer-readable storage medium of claim 13, wherein the operations further comprise:

receiving a request to initiate the computing unit prior to receiving the request to updating the target container;

receiving a request to include the target container within the computing unit upon generation; and generating the computing unit.

* * * * *